Sept. 22, 1970    N. R. SINGLETON    3,529,838
SHAFT SEAL LIFT-OFF ARRANGEMENT
Filed Jan. 15, 1968

WITNESSES:
Leon M. Garman
James F. Young

INVENTOR
Norman R. Singleton
BY Zygmund L. Germer
ATTORNEY

United States Patent Office 3,529,838
Patented Sept. 22, 1970

3,529,838
SHAFT SEAL LIFT-OFF ARRANGEMENT
Norman R. Singleton, Penn Hills, Pa., assignor to Westinghouse Electric Corporation, Pittsburgh, Pa., a corporation of Pennsylvania
Filed Jan. 15, 1968, Ser. No. 697,726
Int. Cl. F16j 15/16, 15/34
U.S. Cl. 277—27                    10 Claims

ABSTRACT OF THE DISCLOSURE

In a controlled leakage face type shaft seal in which the operation depends on the balance of hydrostatic pressure forces acting in the axial direction on a non-rotating floating seal ring, the flow passage between the seal ring and a rotating member (runner) is constructed to provide a zero net axial force on the seal ring only at the operating clearance. Before pressurization, the seal faces contact each other under the influence of gravity and of light compression springs. In order to assure that the seal ring will rise to the equilibrium position when pressure is applied to the seal, the configuration of the seal face is made such that a net hydraulic force is provided which is sufficient to lift the seal ring to the equilibrium position.

BACKGROUND OF THE INVENTION

This invention relates, generally, to sealing devices for the sealing of fluids and, more particularly, to controlled leakage face type seals for movable members such as rotating shafts.

The operation of a prior high pressure shaft seal depends on the balance of hydrostatic pressure forces acting in the axial direction on a non-rotating floating seal ring. The flow passage between the seal ring and a rotating runner, which forms a part of or is mounted on the shaft, is constructed to provide a zero net axial force on the seal ring only at the operating clearance. A deviation from the operating clearance so changes the pressure distribution on the primary sealing face of the seal ring that the seal ring is moved back to the equilibrium position.

Before pressurization, the seal faces contact each other under the influence of gravity and of light compression springs which act against the top of the seal ring. Unless the seal ring is lifted to separate the seal faces upon pressurization and before rotation of the shaft, the surfaces of the seal faces will be in contact during rotation and may be damaged.

An object of this invention is to provide a seal face configuration which assures that the seal ring will rise to the equilibrium position when pressure is applied to the seal.

Another object of the invention is to provide a shaft seal lift-off arrangement which will function with controlled leakage seals of different types, such as tapered-face seals and stepped-face seals.

Other objects of the invention will be explained fully hereinafter or will be apparent to those skilled in the art.

SUMMARY OF THE INVENTION

In accordance with one embodiment of the invention, a controlled leakage face type seal is provided between a shaft runner having a radially extending seal face thereon and an axially movable seal ring encircling the shaft and having a seal face confronting the face on the runner. The operation of the seal depends on the balance of hydrostatic pressure forces acting in the axial direction on the non-rotating floating seal ring. In order to obtain a self-restoration of the relative positions of the seal ring and ther unner upon a variation in the seal gap, the fluid flow path between the seal ring and the runner is of decreasing thickness from the high pressure edge of the gap to an intersection diameter between the seal face extremities. Before pressurization, the seal faces contact each other under the influence of gravity and light compression springs. In order to assure that the seal ring will rise to the equilibrium position when pressure is applied to the seal, the intersection diameter is so located with reference to the balance or equilibrium diameter of the seal ring that the hydraulic lifting force exceeds the seating force on the seal ring.

BRIEF DESCRIPTION OF THE DRAWING

For a better understanding of the nature and objects of the invention, reference may be had to the following detailed description, taken in conjunction with the accompanying drawing, in which.

DESCRIPTION OF THE PREFERRED EMBODIMENT

Figure 1:
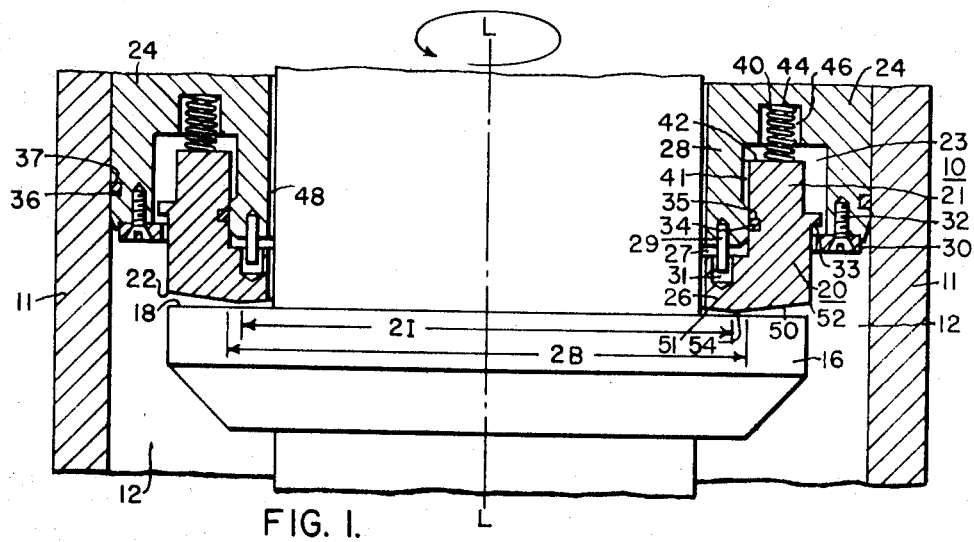
FIG. 1 is a view, in section, of a shaft seal lift-off arrangement embodying principal features of the invention.

Referring to the drawing, and particularly to FIG. 1, the seal arrangement shown therein is generally of the type fully described in Pat. No. 3,347,552, issued Oct. 17, 1967, to Erling Frisch. The structure shown comprises a housing 10 having an annular wall 11 adapted to form a pressure chamber 12 within the housing 10. A shaft 14 is rotatably mounted within the housing 10 and is provided with a runner 16 having a radially extending annular seal face 18 thereon. A seal ring 20 encircles the shaft 14 and is provided within a seal face 22 confronting the seal face 18 on the runner 16. The seal ring 20 is generally L-shaped in cross-section and has a leg 21 extending upwardly into a recess 23 in an annular retaining member 24 fixed in the housing 10. The retaining member 24 includes a downwardly extending portion 28 disposed between the shaft 14 and the leg 21, and above a horizontal leg 26 on the seal ring 20.

Axial movement of the seal ring 20 is limited by the clearance 27 between the leg 26 and the portion 28 of the retaining member 24. Rotative movement of the seal ring 20 is limited by a plurality of pins 29 fixed in the portion 28 of the member 24 and extending into circular recesses 31 in the leg 26 and having a diameter slightly greater than the diameter of the pins 29. The seal ring 20 is retained in the recess 23 by a retaining ring 30 attached to the member 24 by screws 32 and disposed to engage a shoulder 33 on the seal ring 20. The housing wall 11 and the retaining member 24 with its downwardly extending portion 28 form the extremities of the pressure chamber 12.

In order to prevent leakage from the pressure chamber 12 along the path between the downwardly extending portion 28 and the seal ring 20, suitable means, such as an O-ring 34, is disposed in an annular groove 35 in the leg 21 of the seal ring 20 and juxtaposed to the downwardly extending retainer portion 28. The O-ring 34 is composed of resilient material and is mounted in compression between the retainer portion 28 and the seal ring 20 to prevent fluid leakage therepast, yet permit limited movement between the seal ring and the retainer portion 28. An additional O-ring 36 is disposed in a circumferential groove 37 in the outer surface of the member 24 adjacent the wall 11 of the housing 10 to prevent the flow of fluid from the high pressure region 12 along the joint between the housing wall 11 and the retaining member 24.

It will be appreciated that the seal ring 20 is mounted for limited axial movement relative to the shaft 14 and its runner 16. Also, rotative movement of the seal ring 20 is limited by the anti-rotational pins 29 which fit loosely in the recesses 31 formed in the seal ring 20. The seal face 22 on the seal ring 20 is biased into engagement with the seal face 18 on the runner 16 by gravity and by symmetrically spaced light coil springs 40 disposed in compression between an upper surface 42 on the seal ring and an inward surface 44 formed in recesses 46 in the retainer member 24.

As explained in the aforesaid patent, the surface 42 of seal ring 20 is subjected to the full pressure of high pressure chamber 12. In addition, it is desirable to provide a pressure barrier between the high pressure chamber 12 and an annular low pressure region 48 adjacent the shaft 14 and formed by the retainer 24. The seal ring 20 is utilized as the pressure barrier means, but permits a controlled amount of fluid-leakage flow to the region 48 from the pressure chamber 12 along a seal gap 50 provided between the confronting seal faces 18 and 22 on the runner 16 and the seal ring 20, respectively. The seal gap 50 extends between a high pressure extremity 52 and a low pressure extremity 51 of the seal ring 20. The thickness of the fluid in the gap 50 and, consequently, the amount of leakage flow through the gap 50 is determined by the configuration of the seal ring 20.

In order to obatin a self-restoration of the relative position of the seal ring 20 and the runner 16 upon a variation in the seal gap 50 caused by vibration or runner misalignment (wobble), a fluid flow path of decreasing thickness is provided from the high pressure edge or extremity 52 to a position betwen the seal face extremities. More specifically, in the structure illustrated, the fluid flow path of decreasing thickness extends between the outer edge 52 and an intermediate concentric circle located at 54 and having a diameter 2I as indicated in FIG. 1.

As shown in the present structure, the decreasing flow path thickness is formed by tapering the surface 22 slightly away from the confronting surface 18 of the runner 16 between the circle 54 and the outer edge 52 of the seal ring 20. The angle between surfaces 18 and 22 shown in the drawing is exaggerated. This configuration or structure is known as a tapered-face seal. Controlled leakage seals of other types, such as a stepped-face seal may be utilized with the present invention. Accordingly, for a predetermined leakage flow, there is an increase in flow velocity between the concentric circles 52 and 54 with such flow velocity increase corresponding in magnitude to the decrease of the thickness of the flow path caused by the tapering of the confronting surface 22 An increase in flow velocity between circles 52 and 54 also occurs because of smaller circumference.

The operation of the present high pressure shaft seal depends on the balance of hydrostatic pressure forces acting in the axial direction on the non-rotating seal member or ring 20. The flow passage 50 between the seal ring and the rotating runner 16 is constructed to provide a zero net axial force on the seal ring only at the operating clearance. A deviation from the operating clearance changes the pressure distribution on the primary sealing face 22 of the seal ring 20 so that the seal ring 20 is moved back to the equilibrium position.

Figure 2:
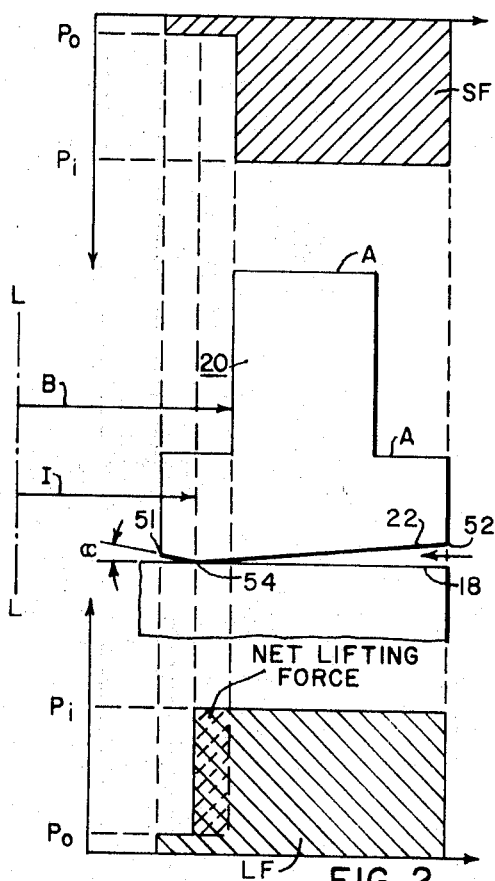
FIG. 2 is a graphical view illustrating the hydraulic forces exerted on a seal ring arrangement of the type shown in FIG. 1.
Figure 3:
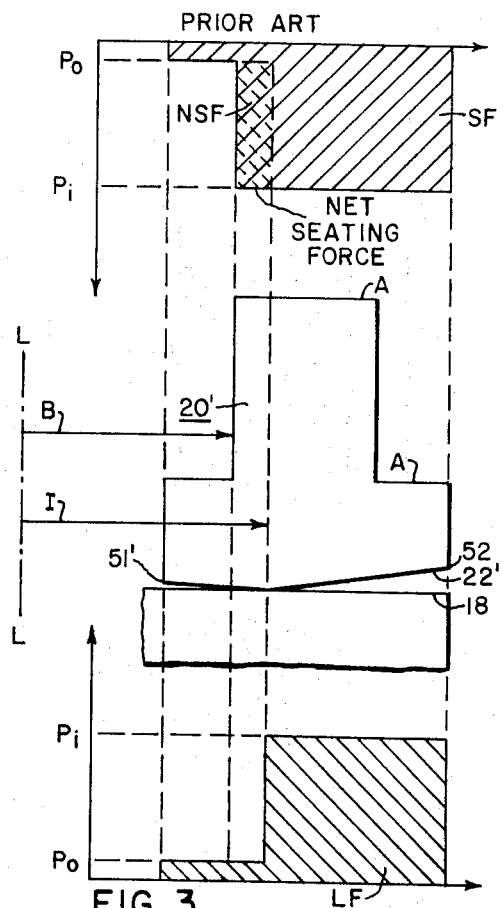
FIG. 3 is a view, similar to FIG. 2, illustrating the hydraulic forces exerted on a prior art seal ring arrangement.

Before pressurization, the seal faces are in contact with each other at 54, the location of which is determined by the intersection diameter 2I as shown in FIG. 1, or the radius I, from the center line L—L as shown in FIGS. 2 and 3. The diameter 2I defines the inner end of the tapered portion of the seal face 22 of the seal ring 20. The seal faces are in contact by virtue of gravity and of the compression springs 40 which act against the top of the seal ring 20.

Since the inner surfaces of the seal faces are customarily flat, or substantially flat, a small rotation of the seal ring which causes the top of the ring to move outwardly radially, combined with an accumulation of crud deposits along the resulting narrow gap at the intersection diameter can cause sealing to occur at the intersection diameter which in prior structures results in a net hydraulic force as shown in FIG. 3 which prevents the seal ring from lifting to the equilibrium position. FIG. 3 shows the pressure forces which act on a seal face configuration in the closed position with a balance diameter 2B, or radius B, less than the intersection diameter 2I or radius I as shown in FIG. 3. The balance diameter of a seal ring 20 is that diameter at which a sealing means such as O-ring 34 is located between the seal ring 20 and the stationary housing portion 28. Thus, the diameter of surface 41 in this example comprises the balance diameter of seal ring 20. Neglecting the weight of the seal ring and the pressure of the springs 40, which are very small compared with the hydraulic force on the ring, the balance diameter 2B or radius B defines the area of the seal ring which is subjected to a downward or seating force. This area A extends outwardly from the balance diameter 2B, or radius B, as shown in FIGS. 2 and 3.

In the graphical representation in FIG. 3, the outlet pressure on the seal is designated by $P_o$, the inlet pressure is $P_i$, the total lifting force is LF and the total seating force is SF. As shown by the shaded area NSF in FIG. 3, the seating force on the seal ring 20' is greater than the lifting force on the seal ring when the balance diameter is less than the intersection diameter. This results from the fact that when the seal faces are in contact at the intersection diameter, the accumulation of crud prevents the flow of fluid inwardly past the intersection diameter, thereby making the net area subjected to the downward pressure of the pressure fluid greater than the net area subjected to the upward or lifting pressure as can be seen in FIG. 3. If the seal surfaces mate perfectly, at least theoretically, crud is not required for a seal to occur at the intersection diameter. In practice, the surfaces do not mate perfectly as manufactured.

This invention provides a seal face configuration which assures that the seal ring will rise to the equilibrium position when pressure is applied to the seal. As shown in FIGS. 1 and 2, the configuration of the seal ring 20 is such that the balance diameter 2B is greater than the intersection diameter 2I. Thus, when the seal faces 22 and 18 are in contact at 54, which is at the intersection diameter, the intersection diameter is less than the balance diameter which means that the portion of the seal face 22 subjected to the pressure fluid provides an area greater than the area A which is determined by the balance diameter. This results in a net lifting force NLF, as shown by the shaded area in FIG. 2, which is sufficient to lift the seal ring to the equilibrium position when the pressure chamber 12 is pressurized. The flow of pressure fluid from the high pressure extremity 52 to the low pressure extremity 51 causes the seal to function in the manner described in the aforesaid patent.

As shown in FIG. 2, the portion of the seal face 22 between 51 and 54 may be flat or it may slant upwardly at a very small angle α. It is undesirable for this position of the seal surface of slant downwardly for the reason that line contact occurs when the seal is seated and wear of the inner edge of the seal may be more rapid than elsewhere on the seal face, thereby causing changes in the seal operating characteristics. Also, the flow velocity is highest at the smallest radius. Therefore, the wear at the inner edge of the seal may be more rapid and thus the change in seal performance may be more rapid if the inner portion of the seal surface slants downwardly. In order to prevent this condition from occurring in spite of manufacturing inaccuracy, the portion of the seal face between 51 and 54 may be machined to slant upwardly at a slight angle, thereby assuring that it will never be slanted downwardly. It will be understood that the angles shown in the present drawing are exaggerated.

From the foregoing description it is apparent that the invention provides a seal configuration for a controlled leakage seal which obviates the possibility of the floating seal ring being prevented from lifting to its equilibrium position when fluid pressure is applied to the seal ring. Failure of the seal ring to lift to the equilibrium position would result in damage to the seal faces during rotation of the shaft for which the seal is provided. The seal arrangement herein described assures that the seal ring will rise to the equilibrium position when pressure is applied to the seal. The present arrangement requires a simple, but very important, change in the configuration of seals of prior types.

In the specific example of a preferred embodiment it must be noted that the intersection diameter 2I is defined to be smaller than the balanced diameter 2B. In this connection it must be realized that in the preferred embodiment the seal ring 20 is formed such that high pressure is applied to the outer periphery of seal ring 20 and that low pressure is adjacent the inner periphery of seal ring 20. Thus, it must be realized that relationship of the intersection diameter to the balance diameter should be expressed more fundamentally in relationship to the pressure distribution across the seal ring 20. To define this relationship in the preferred embodiment it will be seen that the intersection diameter 2I must be sized such that the intersection 54 of seal ring 20 is on the *low pressure side* of the balance diameter 2B. From this definition it will be appreciated by those of ordinary skill in the art that for a seal arrangement where the high pressure region is adjacent the inner edge of the seal ring and the low pressure region is adjacent the outer edge of the seal ring, the intersection diameter, in order to be on the low pressure side of the balance diameter, must be larger than the balance diameter of the seal ring. In such instance, of course, the configuration of the tapered portions of the seal face would also be reversed from the showing of the preferred embodiment.

It must be further appreciated that for a step-faced seal, the intersection diameter would be that diameter at which the step is formed on the seal face. Thus, in accordance with the invention for a step-face seal, the step is formed on the low pressure side of the balance diameter.

Since numerous changes may be made in the above described construction and different embodiments of the invention may be made without departing from the spirit and scope thereof, it is intended that all subject matter contained in the foregoing description or shown in the accompanying drawing shall be interpreted as illustrative and not in a limiting sense.

I claim:

1. A shaft seal lift-off arrangement comprising a rotatable shaft having a radially extending annular seal face thereon, housing means having walls thereon defining a pressure chamber and receiving said shaft therein, an axially movable seal ring encircling said shaft and mounted in said housing means, said seal ring having a pair of opposed generally radial surfaces thereon one of said seal ring surfaces having an area exposed entirely to a high pressure in the pressure chamber to provide a seating force on the ring, sealing means located between the seal ring and the housing means at the balance diameter of the seal ring, a seal face on the other of said surfaces on the seal ring confronting the seal face on the shaft, the seal face on the ring having one extremity exposed to said pressure chamber and the other extremity exposed to a relatively low pressure region in said housing to provide a lifting force on the ring, said seal faces being separated during operation under pressure to provide a fluid flow path therebetween, said path being of different thicknesses between the high pressure extremity and the low pressure extremity, an intersection diameter located at the minimum thickness of the flow path and between the seal face extremities, means biasing the seal faces into contact with each other before pressurization, and said intersection diameter being located on a seal face on the low pressure side of the balance diameter to provide a lifting force on the seal ring that exceeds the seating force to raise the ring to an equilibrium position when the chamber is pressurized.

2. The shaft seal lift-off arrangement of claim 1, wherein the seal faces are in contact at the intersection diameter before pressurization of the pressure chamber.

3. The shaft seal lift-off arrangement of claim 2, wherein the balance diameter is greater than the intersection diameter.

4. In a fluid seal arrangement, in combination, a rotatable shaft having a runner thereon, a radially extending annular seal face on the runner, housing means having walls thereon defining a pressure chamber and receiving said shaft therein, a seal ring encircling the shaft and floating in said housing, means for limiting movement of the ring in the housing, said seal ring having a pair of opposed generally radial surfaces thereon, one of said seal ring surfaces having an area exposed to a fluid under pressure in the pressure chamber to provide a seating force on the ring, sealing means located between the seal ring an the housing means defining a balance diameter of the seal ring, a seal face on the other of said surfaces on to a low pressure region to provide a lifting force on the ring, said seal faces being separated during operation under pressure to provide a gap therebetween for the flow of fluid toward the low pressure region, one of said seal faces being tapered to make said gap convergent in the direction of fluid flow from the high pressure extermity to an intersection diameter between the seal face extremities, means biasing the seal faces into contact with each other before pressurization, and said intersection diameter being located on the low pressure side of the balance diameter to provide a lifting force on the seal ring that exceeds the seating force to raise the ring to an equilibrium position when pressure fluid is admitted to the pressure chamber.

5. The combination defined in claim 4, wherein the contact between the seal faces is at the intersection diameter.

6. The combination defined in claim 5, wherein the intersection diameter is less than the balance diameter.

7. The combination defined in claim 4, wherein the tapered face is on the seal ring.

8. The combination defined in claim 4, wherein the intersection diameter is between the balance diameter and the low pressure extremity of the seal ring.

9. The combination defined in claim 4, wherein the seal face which is tapered slants at a small angle away from the other confronting seal face between the intersection diameter and the low pressure extremity of said seal face.

10. The combination defined in claim 7, wherein the seal face on the seal ring slants at a small angle away from the seal face on the runner between the intersection diameter and the low pressure extremity of said seal face.

References Cited

UNITED STATES PATENTS 3,347,552  10/1967  Frisch _____ 277—27

FOREIGN PATENTS 1,012,085  12/1965  Great Britain.
1,422,767  11/1965  France.

SAMUEL ROTHBERG, Primary Examiner

U.S. Cl. X.R.

277—91